Inventors
ALFRED J. WENZEL
ALWIN K. HANTEL
By
Wolfe, Hubbard, Voit & Osann
Attorneys

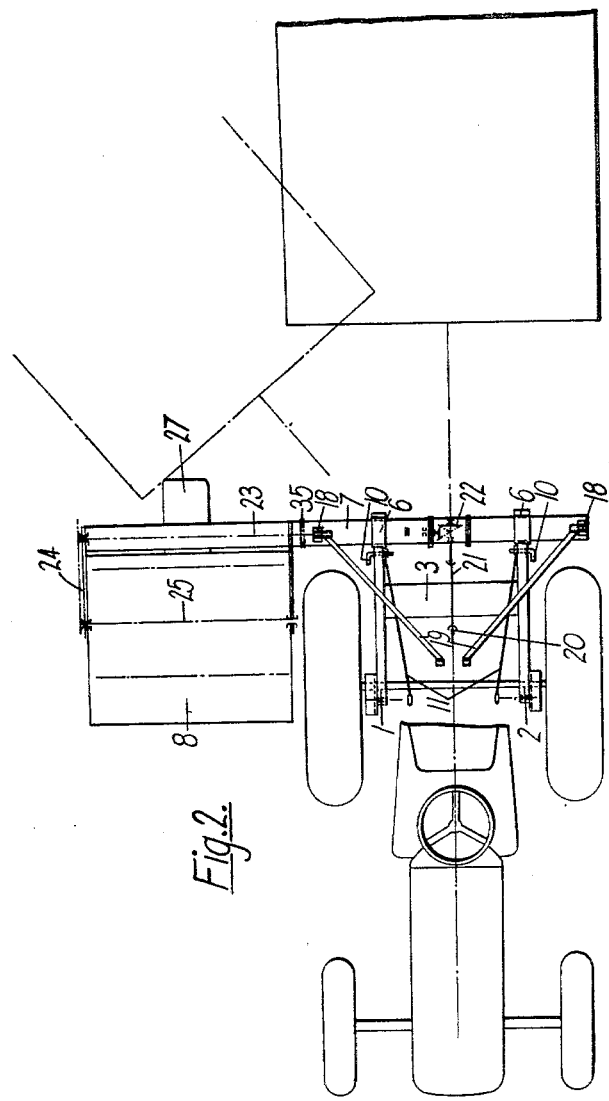

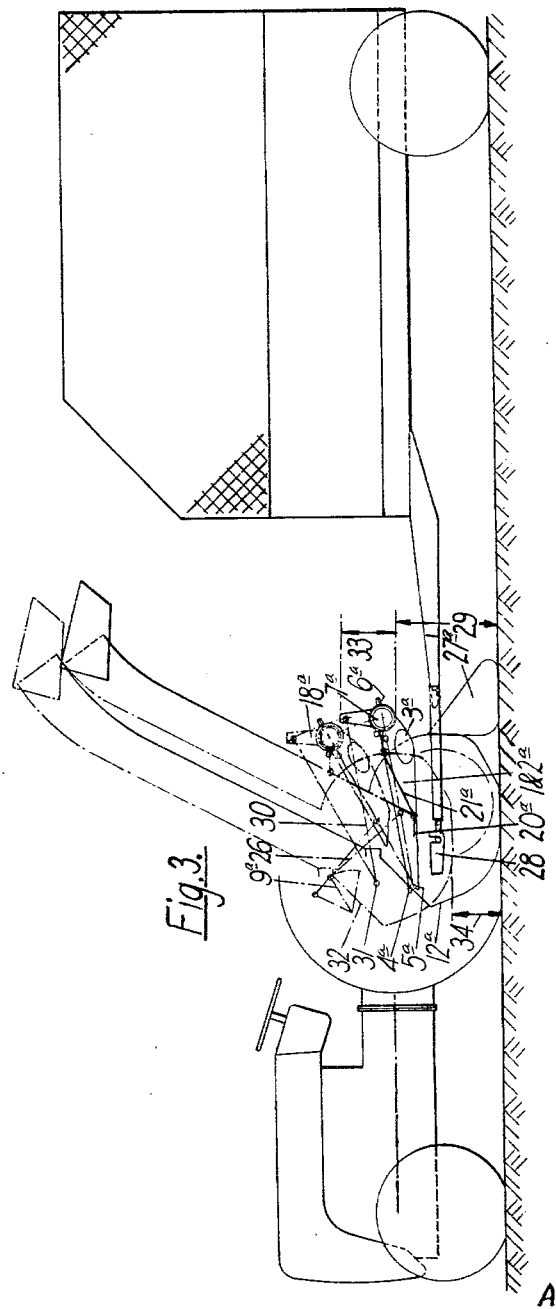

Jan. 18, 1966   A. J. WENZEL ETAL   3,229,451
SIDE MOUNTING FOR TRACTOR IMPLEMENT
Filed June 6, 1963   5 Sheets-Sheet 4
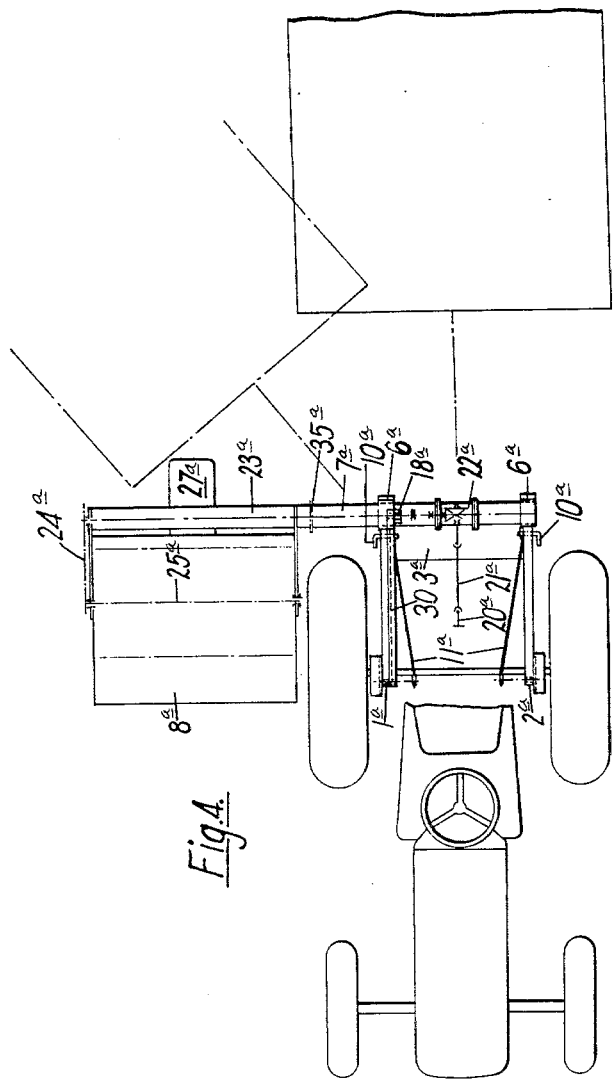
*Inventors*
ALFRED J. WENZEL
ALWIN K. HANTEL
By
Wolfe, Hubbard, Voit & Osann
*Attorneys*

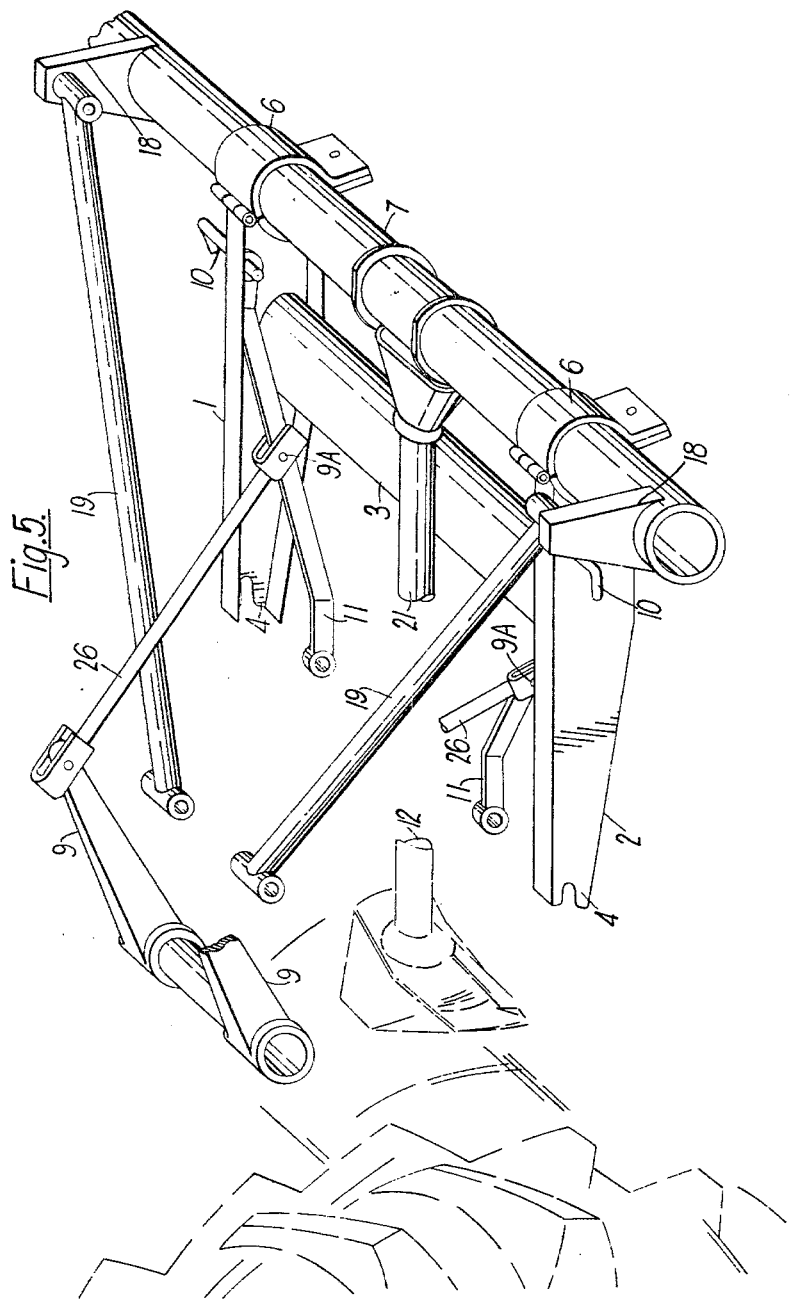

United States Patent Office 3,229,451
Patented Jan. 18, 1966

3,229,451
SIDE MOUNTING FOR TRACTOR IMPLEMENT
Alfred J. Wenzel and Alwin K. Hantel, Eschwege (Werra), Germany, assignors to Massey-Ferguson G.m.b.H., Kassel, Germany
Filed June 6, 1963, Ser. No. 286,094
Claims priority, application Great Britain, June 6, 1962, 21,846/62
3 Claims. (Cl. 56—10)

This invention relates to tractor mounted agricultural implements and concerns, more particularly, a side mounting arrangement for such implements.

An object of the invention is to provide a strong and dependable side mounting for tractor propelled implements. A related object is to arrange a mounting of the above type for vertical movement under the control of the tractor power lift without imposing other than normal lifting loads on the power lift structure.

Another object is to provide a side mounting arrangement of the above character which facilitates rapid and easy coupling of the implement and the tractor.

A further object is to provide a mounting arrangement as characterized above which permits a wagon to be trailed behind the tractor, there being adequate side-to-side clearance for the wagon drawbar and provision for insuring substantial implement travel clearance despite the vertical lifting limitations imposed by the drawbar.

It is also an object to provide an arrangement of the above described type which includes a safe and protected power driving train from the tractor PTO to the side mounted implement.

Other objects and advantages of the invention will become apparent upon reading the following detailed description and upon reference to the drawings, in which:

FIG. 2 is a plan of the tractor and implement combination shown in FIG. 1;

FIG. 3 is similar to FIG. 1 and shows a modification of the mounting arrangement;

FIG. 4 is similar to FIG. 2 and shows the FIG. 3 modification; and

FIG. 5 is a fragmentary perspective showing the mounting arrangement appearing in FIGS. 1 and 2.

Figure 1:
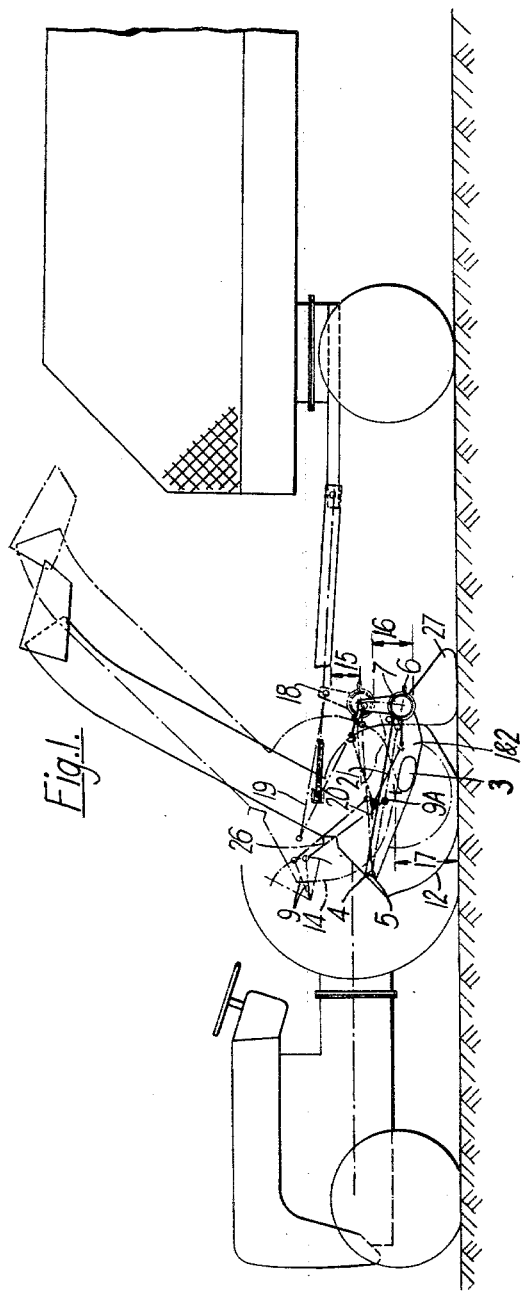
FIGURE 1 is a side elevation of a tractor and implement combination including a mounting arrangement embodying the invention.

While the invention will be described in connection with preferred embodiments, it will be understood that we do not intend to limit the invention to those embodiments. On the contrary, we intend to cover all alternatives, modifications and equivalents as may be included within the spirit and scope of the invention as defined by the appended claims.

Turning first to FIGS. 1 and 2, there is shown a mounting apparatus including a pair of forwardly extending arms 1 and 2 interconnected by a tubular cross brace 3 so as to form a single rigid structure. The arms 1, 2 have their forward ends 4 connected by respective pivot bolts 5 to the body of the tractor. The rear ends of the arms 1, 2 are fitted with split bearings 6, each of which include hinged portions so that the bearings can be opened and closed.

The mounting apparatus also includes a rigid tubular transverse beam 7 which is disposed rearwardly of the tractor and extended to one side sufficiently far to lie behind an implement 8 positioned laterally adjacent to the tractor. In the illustrated embodiment, the implement 8 takes the form of a forage harvester. The beam 7 is rotatably secured within the bearings 6 so that the arms 1, 2, their cross brace 3, and the beam 7 define a strong, laterally rigid support that swings vertically on the tractor. The implement 8 is secured to the laterally extending end of the beam 7.

The tractor power lift includes, as is conventional, a pair of lift arms 9 connected by drop links 26 to lower draft links 11. The trailing ends of the draft links 11 are connected by pins 10 to respective ones of the arms 1 and 2 so as to couple the mounting arrangement to the power lift of the tractor.

It will be apparent that when the harvester 8 is lifted either wholly or partly from the ground by the tractor power lift, the moment of the offset weight is transmitted through the beam 7, the arms 1, 2, and the pivot bolts 5 to the tractor body, and thus the power lift is relieved of twisting stresses which an offset load would ordinarily impose. Viewed another way, the work of the power lift is confined to its normal lifting function.

To couple the harvester 8 to the tractor, the open forward ends 4 of the arms 1 and 2 are slipped over the bolts 5 and the draft links 11 are attached to the arms by the pins 10. The bearings 6 are then opened and the tractor is driven backwardly until the bearings lie beneath the beam 7 which is rigidly secured to the harvester. The tractor power lift is then operated to raise the bearings into engagement with the beam, and the hinge portions are closed around the beam and locked.

To permit a wagon or similar vehicle to be trailed behind the tractor, the beam 7 carries a pair of rigid upwardly extending arms 18 coupled by links 19 to the tractor body. As best seen in FIG. 1, the links 19 rotate the beam 7 when the mounting support structure is raised so as to elevate the implement a substantial distance 17 from a working position 12 to a transport position 14. Because of this rotational movement of the beam 7, the vertical range of movement 16 of the beam can be minimized and an adequate clearance 15 maintained between the beam and the trailer drawbar. The links 19 are sharply diverged rearwardly so as to provide adequate side-to-side clearance for the trailer drawbar (see FIG. 2).

To provide power for the harvester 8, the tractor PTO shaft is coupled through a shaft 21 and universal joints to bevel gearing 22 housed within the tubular interior of the beam 7. A drive shaft 23 is journalled within the beam 7 and transmits power from the bevel gearing 22 to an external chain and sprocket drive 24 that is extended forwardly to a drive shaft 25 for the harvester 8.

As will be evident to those familiar with this art, the vertical position of the harvester can be controlled by the tractor hydraulic power lift so as to select the operative cutting height of the harvester. When the harvester is fully lowered, skids 27 on the harvester rest on the ground.

In the embodiment shown in FIGS. 3 and 4, parts similar to those previously described have been given the same reference numeral with the distinguishing suffix *a* added. This modification is particularly useful when the tractor trails the illustrated type of single axle wagon hitched to the tractor by a low level drawbar to a coupling hook 28 on the underside of the tractor body. Because of this arrangement, the transverse beam 7a is supported at a higher lever than in the FIGS. 1 and 2 modification and it has a minimum height indicated by the distance 29.

To insure adequate clearance beneath the harvester upon raising the beam 7a through a distance 33, a single upper link 30 is pivoted at 31 to the tractor body and is connected to an upstanding arm 18a affixed to the beam 7a. The link 30 rotates the beam 7a as the latter is raised by the tractor power lift in a direction tending to elevate the harvester 8a. As a practical matter, the rotation of the beam 7a is just about sufficient in this embodiment to maintain the harvester 8a in substantially its original horizontal relationship with respect to the ground, but the net effect is to insure an adequate clearance 34 between the harvester and the ground when the harvester is in transport position.

Preferably, the beams 7 and 7a are made in two lengths joined together by a releasable coupling 35 disposed between the tractor and the harvester. In this way, when the tractor has to pass through a gateway or other area of restricted width, the beam can be divided and the tractor used to simply pull the harvester through the restricted opening before the latter is again mounted alongside of the tractor.

We claim as our invention:

1. The combination with a tractor and a laterally adjacent implement comprising, a rigid transverse beam disposed rearwardly of said tractor and said implement, said implement being secured to said beam, a pair of arms rotatably receiving said beam for rotation about its axis, said arms being extended forward into pivotal engagement with said tractor, a tubular brace fixed between said arms so that said beam and said arms form a laterally rigid support for said implement that swings vertically on said tractor, said tractor having a power lift, means coupling said rigid support to said power lift, and a link coupling said beam and said tractor so as to rotate the beam in said arms and thus elevate the implement as said rigid support is raised by the power lift.

2. The combination of claim 1 including a power transmitting shaft journalled within said beam and connecting said tractor with said implement.

3. The combination with a tractor and a laterally adjacent implement comprising, a rigid transverse beam disposed rearwardly of said tractor and said implement, said implement being secured to said beam, a pair of arms each having a bearing rotatably receiving said beam for rotation about its axis, said arms being extended forward into pivotal engagement with said tractor, a tubular brace fixed between said arms so that said beam and said arms form a laterally rigid support for said implement that swings vertically on said tractor, said tractor having a power lift, means coupling said rigid support to said power lift, and said bearings being split and hinged so as to be openable for freely releasing said beam.

References Cited by the Examiner

UNITED STATES PATENTS

| | | | |
|---|---|---|---|
| 2,801,509 | 8/1957 | Salzmann | 56—25 |
| 2,830,422 | 4/1958 | Morkoski et al. | 56—25 |
| 2,849,850 | 9/1958 | O'Donnell et al. | 56—15 |
| 2,935,139 | 5/1960 | Dede | 172—47 X |
| 3,087,294 | 4/1963 | Kessler | 56—24 |
| 3,141,284 | 7/1964 | Reynolds | 56—23 X |

FOREIGN PATENTS

| | | |
|---|---|---|
| 619,713 | 3/1949 | Great Britain. |
| 931,516 | 7/1963 | Great Britain. |

ABRAHAM G. STONE, *Primary Examiner.*

ANTONIO F. GUIDA, T. GRAHAM CRAVER,
*Examiners.*